(12) United States Patent
Zwaal

(10) Patent No.: US 8,812,522 B2
(45) Date of Patent: Aug. 19, 2014

(54) MANAGING A NAVIGATION HISTORY

(75) Inventor: Frederik Hugo Zwaal, Breda (NL)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/519,430

(22) PCT Filed: Feb. 12, 2010

(86) PCT No.: PCT/EP2010/051805
§ 371 (c)(1),
(2), (4) Date: Jul. 9, 2012

(87) PCT Pub. No.: WO2011/098139
PCT Pub. Date: Aug. 18, 2011

(65) Prior Publication Data
US 2012/0284286 A1    Nov. 8, 2012

(51) Int. Cl.
*G06F 7/00* (2006.01)
*G06F 17/30* (2006.01)

(52) U.S. Cl.
USPC .......................................................... 707/752

(58) Field of Classification Search
USPC .......................................................... 707/752
See application file for complete search history.

(56) References Cited

U.S. PATENT DOCUMENTS

| 7,617,458 B1 * | 11/2009 | Wassom et al. ............... 715/760 |
| 2005/0132297 A1 | 6/2005 | Milic-Frayling et al. |
| 2007/0028267 A1 | 2/2007 | Ostojic et al. |
| 2007/0157094 A1 | 7/2007 | Lemay et al. |

* cited by examiner

*Primary Examiner* — Alexey Shmatov
(74) *Attorney, Agent, or Firm* — Coats and Bennett, P.L.L.C.

(57) ABSTRACT

In a mobile terminal, which is able to access resources available over a network, a navigation history is stored. Specifically, the resources are stored in an order in which they are visited by a user, whereby the user can navigate through the stored resources in reverse order by means of a back button. When the stored resources contain a predetermined number of occurrences of a specific resource, the predetermined number being at least two, and the user navigates to the specific resource again, the stored resources between two of said occurrences of the specific resource, and one of said occurrences of the specific resource, are deleted from the stored navigation history.

13 Claims, 3 Drawing Sheets

| Sequence number | Visited resource | Resulting stored navigation history |
|---|---|---|
| S1 | A | A |
| S2 | B | AB |
| S3 | C | ABC |
| S4 | D | ABCD |
| S5 | E | ABCDE |
| S6 | F | ABCDEF |
| S7 | G | ABCDEFG |
| S8 | D | ABCDEFGD |
| S9 | A | ABCDEFGDA |
| S10 | B | ABCDEFGDAB |
| S11 | H | ABCDEFGDABH |
| S12 | I | ABCDEFGDABHI |
| S13 | D | ABCDABHID |

| Sequence number | Visited resource | Resulting stored navigation history |
|---|---|---|
| S1 | A | A |
| S2 | B | AB |
| S3 | C | ABC |
| S4 | D | ABCD |
| S5 | E | ABCDE |
| S6 | F | ABCDEF |
| S7 | G | ABCDEFG |
| S8 | D | ABCDEFGD |
| S9 | A | ABCDEFGDA |
| S10 | B | ABCDEFGDAB |
| S11 | H | ABCDEFGDABH |
| S12 | I | ABCDEFGDABHI |
| S13 | D | ABCDABHID |

Figure 3

| Sequence number | Visited resource | Resulting stored navigation history |
|---|---|---|
| S21 | A | A |
| S22 | B | AB |
| S23 | C | ABC |
| S24 | D | ABCD |
| S25 | E | ABCDE |
| S26 | C | ABCDEC |
| S27 | G | ABCDECG |
| S28 | H | ABCDECGH |
| S29 | C | ABCDECGHC |
| S30 | I | ABCDECGHCI |
| S31 | J | ABCDECGHCIJ |
| S32 | K | ABCDECGHCIJK |
| S33 | C | ABCGHCIJKC |

Figure 4

MANAGING A NAVIGATION HISTORY

TECHNICAL FIELD

This invention relates to storing a navigation history, and in particular to a method of storing a navigation history that prevents the size of the stored navigation history from expanding indefinitely.

BACKGROUND

In a program that allows a user to navigate from one resource to another, it is known to store a navigation history, allowing the user of the program to return to a previously visited resource. For example, the user can return to previously visited resources in an order which is the reverse of the order in which they were first visited, by using a back button. Visited resources may be placed on a stack.

However, this has the disadvantage that the stack of previously visited resources can grow indefinitely. This is a particular disadvantage in the case where the program is intended for use in a mobile device, having constraints on the available memory resources. However, even when the size available memory is not a practical constraint on storing the visited resources, it may be inconvenient to navigate back to the initial resource through a very long stored history.

SUMMARY

According to a first aspect of the present invention, there is provided a method of storing a navigation history. Resources are stored in an order in which they are visited by a user, whereby the user can navigate through the stored resources in reverse order by means of a back button. When the stored resources contains a predetermined number of occurrences of a specific resource, the predetermined number being at least two, and the user navigates to the specific resource again, the stored resources between two of said occurrences of the specific resource, and also one of said occurrences of the specific resource, are deleted from the stored navigation history.

This has the advantage that the size of the stack is limited, while ensuring that the sequence of resources in the navigation history is always logical and intuitive, and that repeatedly going back will always go back to the initially visited resource.

The predetermined number may be two, but it may be configurable.

When the predetermined number is greater than two, the step of deleting from the stored navigation history the stored resources between two of said occurrences may comprise deleting from the stored navigation history the stored resources between two consecutive occurrences. For example, it may comprise deleting the stored resources between a first occurring one and a second occurring one of said occurrences, or between a second most recently occurring one and a most recently occurring one of said occurrences.

According to a second aspect of the invention, there is provided a computer software product, comprising computer readable code, for causing a device to perform a method according to the first aspect.

According to a third aspect of the invention, there is provided a terminal device, comprising: a processor; and a memory, wherein the terminal device is able to establish a connection over a network to visit resources available in the network, wherein the terminal device is configured to store a plurality of resources in an order in which they are visited by a user, whereby the user can navigate through the stored resources in reverse order by means of a back button. When the stored plurality of resources contains a predetermined number of occurrences of a specific resource, the predetermined number being at least two, and the user navigates to the specific resource again, the device is further configured to delete from the stored navigation history the stored resources between two of said occurrences of the specific resource, and also to delete one of said occurrences of the specific resource.

The predetermined number may be two, but it may be configurable.

When the predetermined number is greater than two, the step of deleting from the stored navigation history the stored resources between two of said occurrences may comprise deleting from the stored navigation history the stored resources between two consecutive occurrences. For example, it may comprise deleting the stored resources between a first occurring one and a second occurring one of said occurrences, or between a second most recently occurring one and a most recently occurring one of said occurrences.

BRIEF DESCRIPTION OF THE DRAWINGS

FIG. 3 is a table, illustrating the state of the stored navigation history, at various times in the progress of the method, in an example use case.

FIG. 4 is a second table, illustrating the state of the stored navigation history, at various times in the progress of the method, in an alternative example use case.

DETAILED DESCRIPTION

The method described herein is applicable to a wide range of standalone or connected terminal devices. However, it is described below with reference to a specific example, in which a navigation history is managed in a terminal device that can be connected over a network to a remote site.

Figure 1:
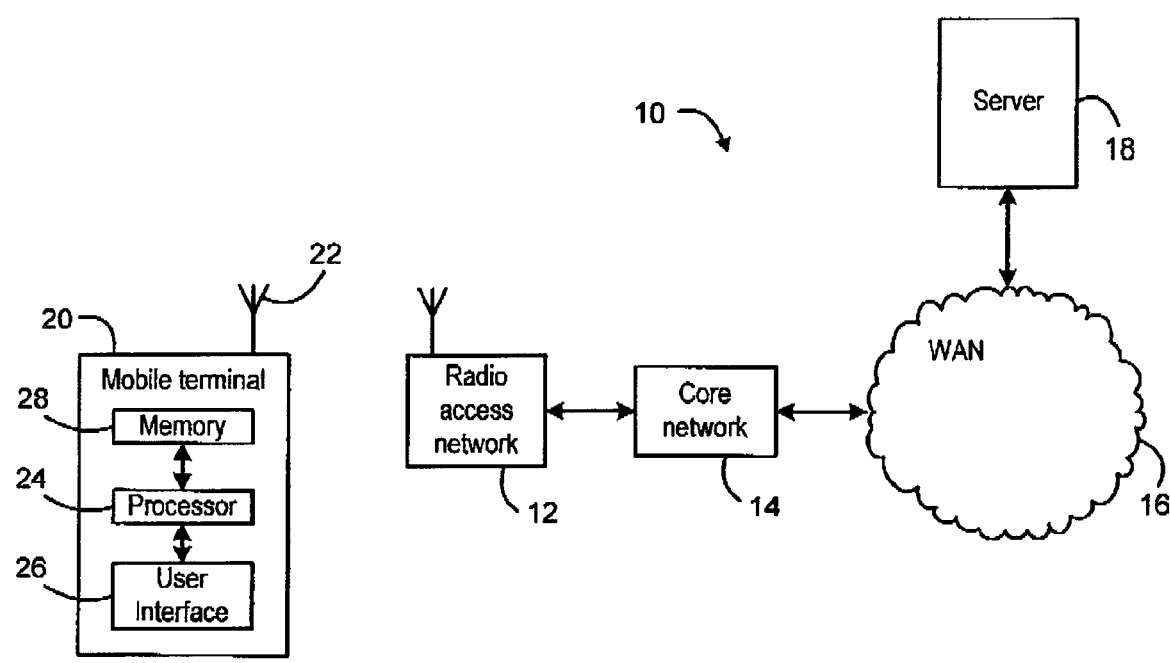
FIG. 1 illustrates a part of a mobile communication network operating in accordance with the present invention.

FIG. 1 illustrates a mobile communications network. Specifically, FIG. 1 shows a mobile communications network 10, having a radio access network (RAN) 12 and a core network (CN) 14. The core network 14 allows connections to be established over a wide area network (WAN) 16, such as the internet. FIG. 1 also shows a server 18 that is used to host content that may be of interest to users of the network, such as screens and menus. It will be apparent that, in practice, such content can be hosted on multiple servers accessible over the network 16.

FIG. 1 also shows a mobile terminal 20, having an antenna 22, such that it can establish a connection into the mobile communications network 10. The mobile terminal 20 is of a generally conventional form, and will not be described in detail, except in so far as is necessary for an understanding of the present invention. Thus, the mobile terminal 20 has a processor 24 for controlling the operation of the device. The processor 24 is connected to a user interface 26, for example including a display and a user input device, such as a keyboard or a touch-screen. The mobile terminal 20 also has a memory 28 for storing data under the control of the processor 24. As is conventional, the mobile terminal may also have various other features and functions, such as a microphone and loudspeaker allowing it to operate as a speech communications device, etc.

In this embodiment of the invention, the mobile terminal 20 is able to run software, that allows it to access the resources, in the form of the screens and menus, that are hosted on the server 18. Specifically, the user of the mobile terminal 20 is able to communicate with server-side applications, for example for managing the placing of calls from the mobile terminal 20. Mechanisms are provided that allow the user to identify the resources that he wishes to visit, using the user interface 26.

Typically, when the software starts running, a start screen is loaded from the server 18 and presented to the user, for example in the form of a menu containing a number of items. When the user selects one of these menu items, this links to another screen, which is then also loaded from the server 18 and displayed. The server may be hosting a large number of such resources that are accessible by the user.

In addition, the software causes the user's navigation history to be stored in the memory 28. That is, the software causes at least some of the resources that have been visited to be stored in a stack in the memory 28. A visited resource is some resource, typically a page or screen, that was presented to be viewed by a user at some point in time. Essentially, a resource becomes visited whenever a user navigates to it from another resource, by clicking or selecting an item on the previous resource.

The storage of the resources can in principle involve storage of the contents of the visited resources themselves. However, the memory requirement is reduced if the storage of the resources takes the form of storing a resource locator, in the form of a pointer to the location of the contents.

Specifically, the software causes these resources to be stored in the order in which they were visited, allowing the user to navigate through the stored resources, either in reverse order, by means of a back button, or in the original order, by means of a forward button, with the back button and the forward button being provided as part of the user interface 26, either as a physical button, or as a part of a touch screen display that provides the relevant functionality, or by suitable speech recognition, for example.

Figure 2:
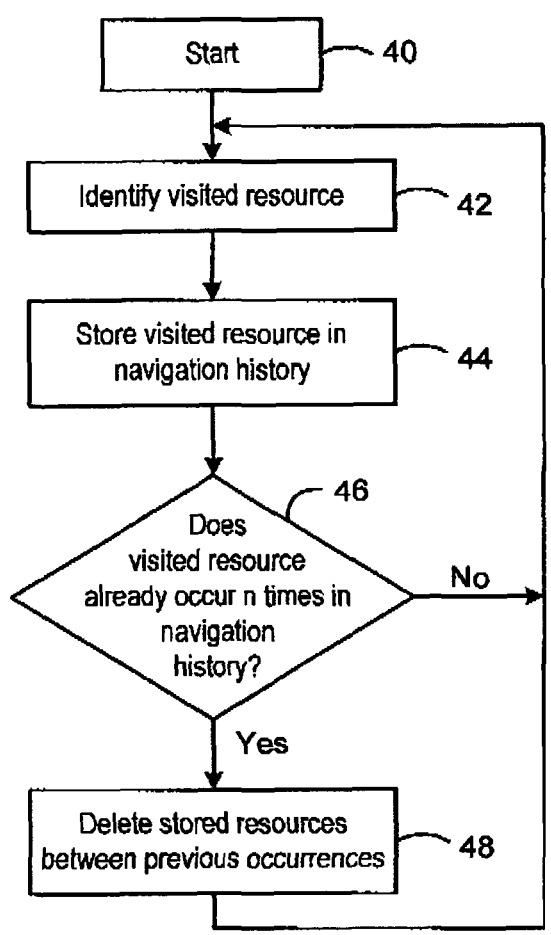
FIG. 2 is a flow chart, illustrating a method in accordance with an aspect of the present invention.

FIG. 2 is a flow chart, illustrating a method by which the resources are stored in the navigation history.

The process starts at step 40, when the user initiates the relevant software in the mobile terminal 20. In step 42, the user visits one of the resources hosted on the server 18, and this is identified by the software.

In step 44, the visited resource is stored in a dedicated area of the memory 28 that contains the stored navigation history. As described above, the visited resource is stored in such a way that the user can navigate forwards and backwards through the stored navigation history, based on the order in which the resources were added to it.

In step 46, it is determined whether the visited resource already occurs in the stored navigation history. If so, it is determined whether the number of previous occurrences is equal to a predetermined number, n. This predetermined number may be fixed, or it may be configurable, for example by the mobile terminal in an application-specific way, and/or by the user, and/or by the network operator.

If the number of previous occurrences is less than the predetermined number, the process returns to the start, until the user visits a new resource. However, if the number of previous occurrences is equal to the predetermined number, the process passes to step 48. In step 48, some of the stored resources are deleted from the stored navigation history.

Specifically, in the case where the predetermined number, n, is equal to 2, such that there are two previous occurrences of a particular resource stored in the navigation history when the user visits that resource again, then the resources between those two previous resources are deleted and one of those two previous occurrences of the resource is deleted.

FIG. 3 is a table illustrating this situation, as it occurs during a session involving visiting a number of resources in a sequence containing sequence numbers S1, S2, S3, . . . . Thus, in the sequence numbers S1-S7, the user visits the resources A-G, in the sequence numbers S8-S10 he revisits the resources D, A and B respectively, and in the sequence S11-S12 he visits the resources H and I. At this point, the stored navigation history simply contains the twelve resources that have been visited, in the order in which they were visited.

Then, in the sequence number S13 he visits the resource D for a third time, and so there are two previous occurrences of the resource D in the stored navigation history.

Therefore, in accordance with step 48 of the procedure shown in FIG. 2, one of these previous occurrences of the resource D is deleted, and the resources visited between the two previous occurrences of resource D (that is, the resources E, F and G) are also deleted.

Thus, the size of the stored navigation history is prevented from growing indefinitely, because no resource can appear more than twice in the stored navigation history. Moreover, because of the way in which the resources are deleted, the remaining stored navigation history is such that the user can return to the most recently visited resources. Further, the remaining stored navigation history is such that the user can return to the initially visited resource, simply by repeated use of the back button. Further, the sequence is such that using the back button never results in a (backward) transition between two resources for which a forward transition never occurred in the past.

FIG. 4 is a table illustrating the situation, as it occurs during a session involving visiting a number of resources in a sequence containing sequence numbers S21, S22, S23, . . . , in the case where the predetermined number, n, is equal to 3.

Thus, in the sequence numbers S21-S25, the user visits the resources A-E, in the sequence number S26 he revisits the resource C, in the sequence numbers S27-S28 he visits the resources G and H, in the sequence number S29 he revisits the resource C again, and in the sequence numbers S30-S32 he visits the resources I, J and K. At this point, the stored navigation history simply contains the twelve resources that have been visited, in the order in which they were visited.

Then, in the sequence number S33 he visits the resource C for a fourth time, and so there are three previous occurrences of the resource C in the stored navigation history.

Therefore, in accordance with step 48 of the procedure shown in FIG. 2, one of these previous occurrences of the resource C is deleted, and the resources visited between two of the previous occurrences of resource C are also deleted.

As shown in FIG. 4, the visited resources between the first and second occurrences (as well as one of the first and second occurrences) are deleted. In other possible implementations, the visited resources between the second and third occurrences (as well as one of the second and third occurrences), or even all of the visited resources between the first and third occurrences (as well as one of the first and third occurrences) could be deleted.

In the case where the predetermined number, n, is greater than 3, there are more possible implementations, in which the visited resources between consecutive or non-consecutive occurrences of that resource could be deleted.

There is thus described a method of storing a navigation history that prevents the size of the stored navigation history from growing indefinitely, while maintaining a stored history that can be used conveniently.

The invention claimed is:

1. A method of storing a navigation history, the method comprising:

storing a plurality of resources in an order in which they are visited to create a stored navigation history, thereby enabling navigation through the stored resources in reverse order by means of a back button;

in response to a specific resource being visited again, and before leaving the specific resource, while the stored navigation history already contains a predetermined number of occurrences of the specific resource from prior visits to the specific resource, deleting from the stored navigation history both:

the stored resources between two of the occurrences of the specific resource from the stored navigation history; and one of the occurrences of the specific resource from the stored navigation history;

wherein the predetermined number is at least two.

2. The method of claim 1 wherein the predetermined number is two.

3. The method of claim 1 wherein the predetermined number is configurable.

4. The method of claim 1:

wherein the predetermined number is greater than two;

wherein the deleting the stored resources between two of the occurrences comprises deleting the stored resources between two consecutive occurrences.

5. The method of claim 4 wherein the two consecutive occurrences are a first occurring one and a second occurring one of the occurrences.

6. The method of claim 4 wherein the two consecutive occurrences are a second most recently occurring one and a most recently occurring one of the occurrences.

7. A computer program product stored in a non-transitory computer readable medium for controlling a processor in a device, the computer program product comprising software instructions which, when run on the processor, causes the device to:

store a plurality of resources in an order in which they are visited to create a stored navigation history, thereby enabling navigation through the stored resources in reverse order by means of a back button;

in response to a specific resource being visited again, and before leaving the specific resource, while the stored navigation history already contains a predetermined number of occurrences of the specific resource from prior visits to the specific resource, delete from the stored navigation history both:

the stored resources between two of the occurrences of the specific resource; and one of the occurrences of the specific resource from the stored navigation history;

wherein the predetermined number is at least two.

8. A terminal device, comprising:

a processor;

memory operatively connected to the processor;

wherein the terminal device is configured to:

establish a connection over a network to visit resources available in the network;

store, in the memory, a plurality of resources in an order in which they are visited to create a stored navigation history, thereby enabling navigation through the stored resources in reverse order by means of a back button;

in response to a specific resource being visited again, and before leaving the specific resource, while the stored navigation history already contains a predetermined number of occurrences of the specific resource from prior visits to the specific resource, delete from the navigation history stored in the memory both:

the stored resources between two of the occurrences of the specific resource;

one of the occurrences of the specific resource;

wherein the predetermined number is at least two.

9. The terminal device of claim 8 wherein the predetermined number is two.

10. The terminal device of claim 8 wherein the predetermined number is configurable.

11. The terminal device of claim 8:

wherein the predetermined number is greater than two;

wherein the two occurrences are two consecutive occurrences.

12. The terminal device of claim 11 wherein the two consecutive occurrences are a first occurring one and a second occurring one of the occurrences.

13. The terminal device of claim 11 wherein the two consecutive occurrences are a second most recently occurring one and a most recently occurring one of the occurrences.

* * * * *